United States Patent
Bartlett

[11] Patent Number: 6,161,996
[45] Date of Patent: Dec. 19, 2000

[54] SECURING APPARATUS FOR TRANSPORTING WHEELED VEHICLES

[76] Inventor: Jerrold Bartlett, P.O. Box 348, Clarkston, Wash. 99403

[21] Appl. No.: 09/178,238

[22] Filed: Oct. 23, 1998

[51] Int. Cl.[7] ....................................................... B60P 7/08
[52] U.S. Cl. .................................... 410/19; 410/7; 410/9; 410/30
[58] Field of Search .................................. 410/3, 4, 7, 9, 410/12, 19, 30, 49; 224/403, 536, 42.38, 558, 570; 248/500, 503

[56] References Cited

U.S. PATENT DOCUMENTS

| | | | |
|---|---|---|---|
| 970,841 | 9/1910 | MacConnell | 410/30 |
| 1,047,048 | 12/1912 | Harrison | 410/19 |
| 2,464,021 | 3/1949 | Bryant | 410/30 |
| 4,093,303 | 6/1978 | Nelson | 410/4 X |
| 4,227,633 | 10/1980 | Sellberg | 410/19 X |
| 4,772,164 | 9/1988 | McFarland | 410/3 |
| 4,854,790 | 8/1989 | Andre | 410/30 |
| 5,011,347 | 4/1991 | Bullock | 410/9 |
| 5,037,255 | 8/1991 | Bullock et al. | 410/30 |
| 5,186,585 | 2/1993 | Sousa et al. | 410/9 |
| 5,388,937 | 2/1995 | Farsai | 410/9 |
| 5,476,203 | 12/1995 | Fletcher . | |
| 5,540,540 | 7/1996 | Peterson . | |
| 5,549,231 | 8/1996 | Fletcher et al. . | |
| 5,553,762 | 9/1996 | Brown . | |
| 5,713,704 | 2/1998 | Pommier et al. | 410/9 |

*Primary Examiner*—Stephen T. Gordon
*Attorney, Agent, or Firm*—Norman B. Rainer

[57] ABSTRACT

Apparatus for immobilizing at least one wheel of a wheeled vehicle resting upon a support surface of a transporting conveyance includes paired gripping members adapted to hingedly engage the support surface in a manner permitting rotative motion between a storage state which disposes the gripping members upon the support surface, and an active state disposing the gripping members in facing parallel spaced apart relationship upright from the support surface. Levered locking mechanisms associated with the extremities of the gripping members are adapted to draw the gripping members together, producing the active state which applies compressive force upon the sidewalls of the wheel.

13 Claims, 3 Drawing Sheets

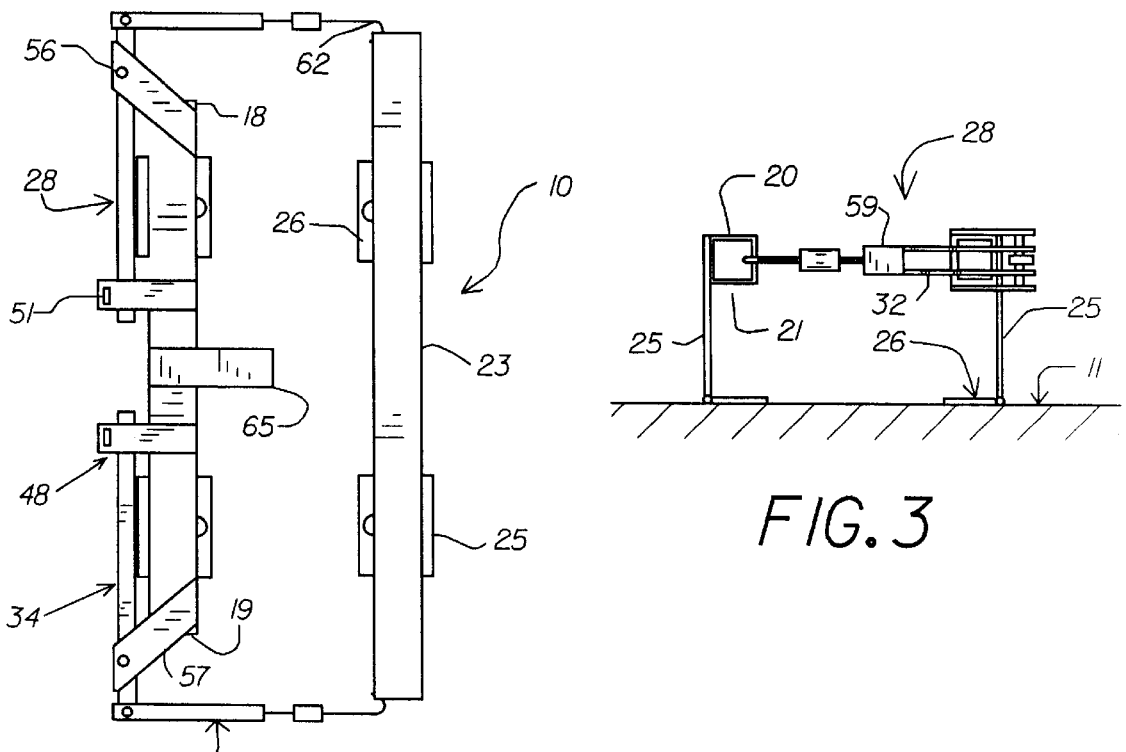
FIG. 2
FIG. 3
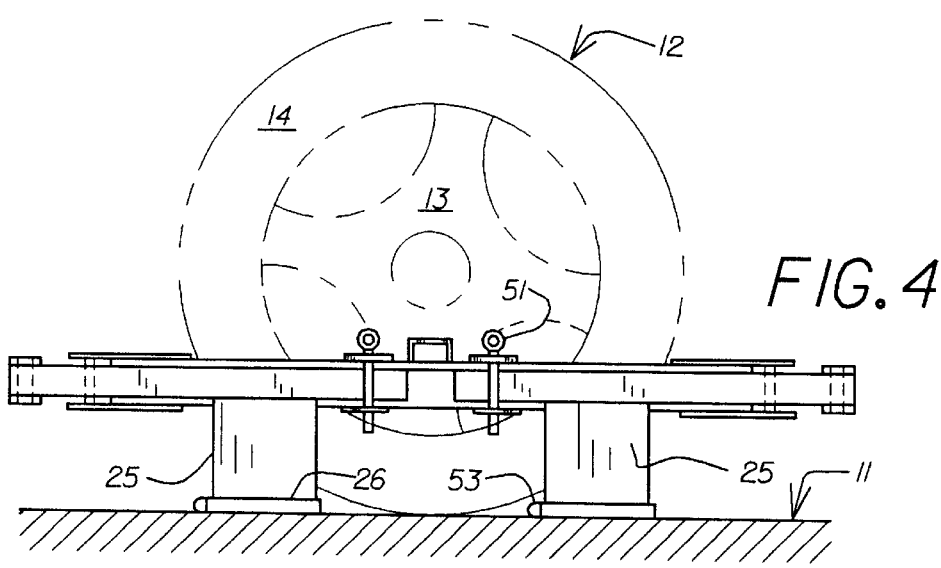
FIG. 4

SECURING APPARATUS FOR TRANSPORTING WHEELED VEHICLES

BACKGROUND OF THE INVENTION

1. Field of the Invention

The present invention relates to the securement of wheeled vehicles upon a transporting conveyance such as a truck, trailer, ship or rail car, and more particularly concerns apparatus for engaging at least one wheel of said wheeled vehicle to achieve immobilization of said vehicle.

2. Description of the Prior Art

In the transportation of wheeled vehicles such as automobiles, motorcycles, all terrain vehicles (ATV), and working vehicles such as tractors, said vehicles are generally driven under their own power onto a transporting conveyance such as a truck, trailer, ship or rail car, and secured to the conveyance so as to achieve immobilization during said transportation. Because the wheeled nature of said vehicles is conducive to rolling movement, it is generally sought to engage the wheels in a manner to prevent their rotative movement.

For example, U.S. Pat. No. 5,011,347 to Bullock discloses a wheel restraining cleat and strap for use with a pair of wheel chocks to anchor a vehicle wheel to a supporting surface of a transporting vehicle. Although effective, the Bullock apparatus requires considerable manipulation. Also, the wheels of the transported vehicle must be precisely positioned with respect to the securing apparatus which is immovably attached to the supporting surface. The Bullock securing apparatus also occupies considerable space on the supporting surface, even when not in use, thereby diminishing the usefulness of the support surface for other cargo-handling functions.

Other devices for securing the wheels of transported vehicles are disclosed in U.S. Pat. Nos. 5,549,231; 5,540,540; and 5,4176,203. In general, such devices are tailored to the needs of specific transported vehicles, particular tire sizes or specialized manner of transport, and most require considerable manipulative effort.

It is accordingly an object of the present invention to provide apparatus for securing a wheeled vehicle to a support surface of a transporting conveyance.

It is another object of this invention to provide securing apparatus as in the foregoing object which immobilizes at least one wheel of said wheeled vehicle.

It is a further object of the present invention to provide securing apparatus of the aforesaid nature which is, easily deployed from a storage state to an active state which achieves engagement with said wheel.

It is yet another object of this invention to provide securing apparatus of the aforesaid nature which, in its storage state minimally affects the general usefulness of said support surface.

It is a still further object of the present invention to provide securing apparatus of the aforesaid nature which accommodates without adjustment wheels of various diameters.

It is an additional object of this invention to provide securing apparatus of the aforesaid nature which can be easily adjusted to accommodate wheels of significantly varied widths.

It is an additional object of the present invention to provide securing apparatus of the aforesaid nature of simple, durable construction amenable to low cost manufacture and easy installation onto said support surface.

These objects and other objects and advantages of the invention will be apparent from the following description.

SUMMARY OF THE INVENTION

The above and other beneficial objects and advantages are accomplished in accordance with the present invention by securing apparatus for immobilizing at least one wheel of conventional circumference, width and sidewall structure of a wheeled vehicle resting upon a support surface of a transporting conveyance, said apparatus comprising:

1) paired gripping members elongated between first and second extremities and adapted to hingedly engage said support surface in a manner permitting rotative motion between a storage state which disposes said gripping members flat upon said support surface, and an active state disposing said gripping members in facing parallel spaced apart relationship upright from said support surface, and 2) levered locking means associated with the extremities of said gripping members and adapted to draw said gripping members together, producing said active state which applies compressive force upon said sidewall structure of said wheel of said wheeled vehicle disposed upon said support surface in a manner wherein the plane of the circumference of said wheel is disposed in parallel relationship between said gripping members.

In a preferred embodiment, two or more units of the securing apparatus of this invention are employed simultaneously in a manner to immobilize each wheel of the wheeled vehicle undergoing transport.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing:

FIG. 2 is a top plan view of the apparatus of FIG. 1 shown in its active state.

FIG. 3 is an end view of the apparatus shown in FIG. 2.

FIG. 4 is a side view of the apparatus of FIG. 2, shown embracing a wheel.

DESCRIPTION OF THE PREFERRED EMBODIMENT

Figure 1:
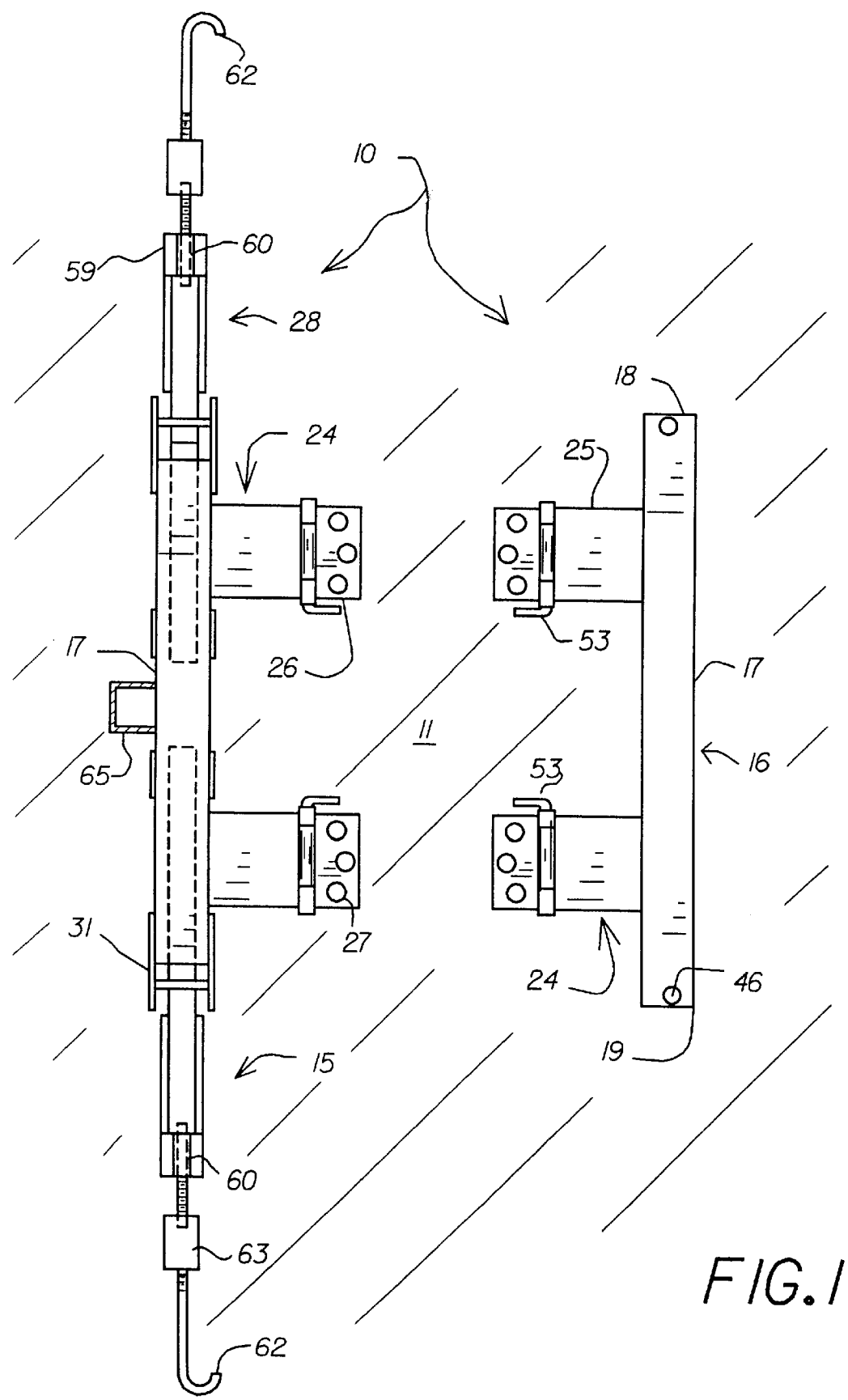
FIG. 1 is a top plan view of an embodiment of the securing apparatus of the present invention, shown in its storage state.
Figure 5:
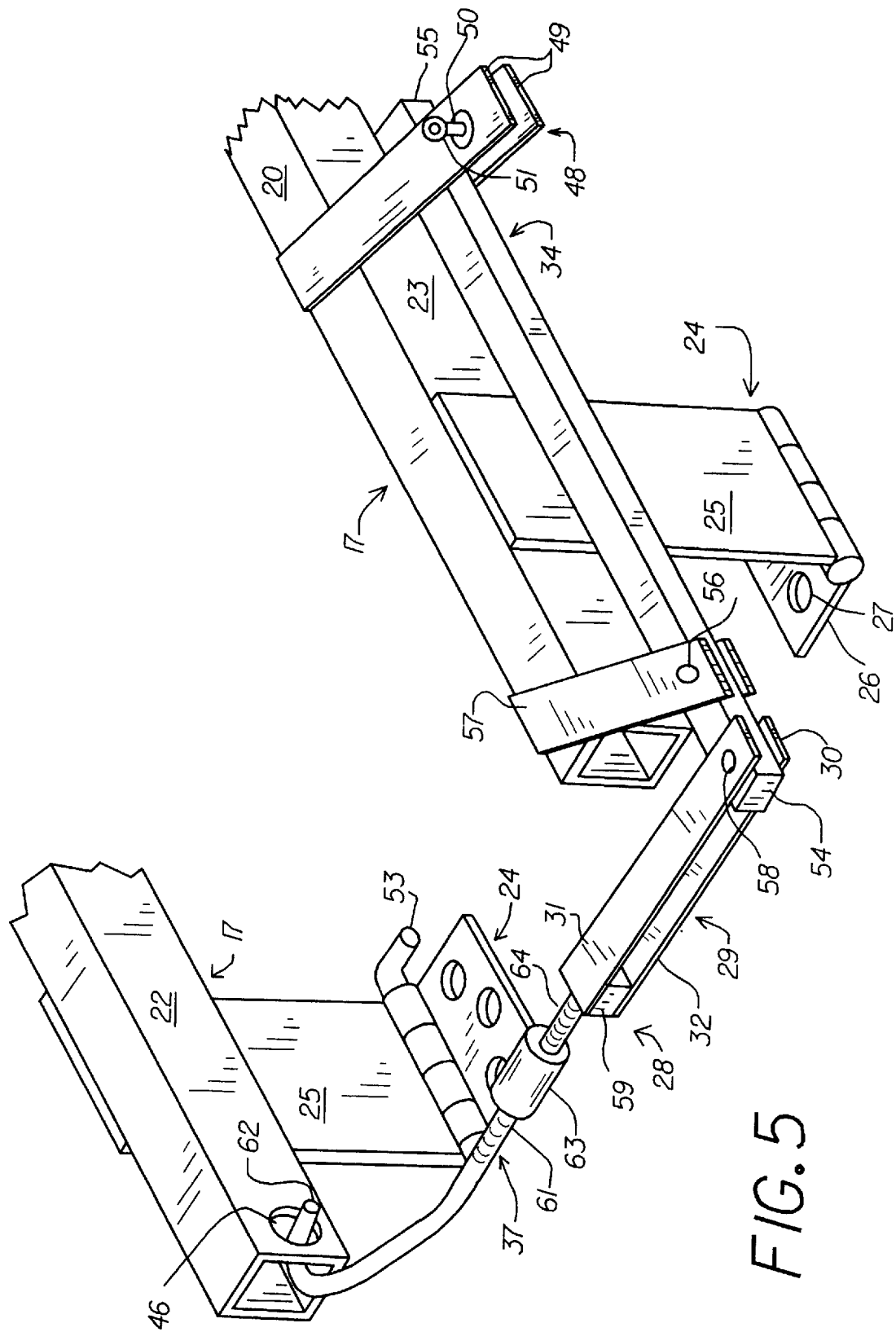
FIG. 5 is an enlarged fragmentary perspective end view of the apparatus shown in FIG. 2.

Referring to FIGS. 1–5, an embodiment of the securing apparatus 10 of the present invention is shown mounted upon the floor support surface 11 of the cargo space of a conventional pick-up truck, and is further shown in functional association with a wheel 12 of a wheeled vehicle being transported by said pick-up truck. Said wheel is generally comprised of a center hub portion 13 and resilient tire portion 14.

Securing apparatus 10 is generally comprised of first and second interactively paired gripping members 15 and 16, respectively. Each gripping member is comprised of a straight rail 17 elongated between first and second extremities 18 and 19, respectively. Rail 17 is preferably fabricated of square tubular steel stock, and may be characterized as having upper and lower surfaces 20 and 21, respectively, and opposed inside and exterior surfaces 22 and 23, respectively.

At least two hinges 24 are associated with each rail, preferably by way of welded or bolted attachment to the exterior surfaces 23 of said rails. Said hinges are comprised of a pivoting arm 25 that attaches to said rails, and a base plate 26 having apertures 27 which facilitate securement by way of bolts or other fasteners to support surface 11. Hinge components 25 and 26 are interengaged by a pivot pin 53 which is preferably removable, thereby facilitating easy installation and removal of the securing apparatus of this invention. The several hinges are secured to said support surface at precisely determined locations that dispose said rails in parallel, spaced apart relationship.

Two levered locking assemblies 28 are associated with the extremities of said rails in a manner such that one locking assembly is disposed at a first extremity of said rails, and a second locking assembly is disposed at a second extremity of the rails. In the illustrated embodiment, both locking assemblies are associated with the same rail. In other embodiments, however, a locking assembly can be associated with each rail, provided said assemblies are at opposite extremities of said rails.

Each levered locking assembly 28 is comprised of a straight operating lever 34, extension arm 29 and adjustable securing arm 37. Said operating lever, shown having a rectangular cross section with upper and lower surfaces, is elongated between proximal and distal extremities 54 and 55, respectively. Said operating lever is engaged adjacent its proximal extremity by first pivot pin 56 held by paired bracket plates 57 welded to the upper and lower surfaces of a rail 17 at an extremity thereof. Such manner of securement enables said lever to swing in a horizontal path co-extensive with associated rail 17.

Extension arm 29 is elongated between first and second extremities 30 and 31, respectively, said first extremity being joined by second pivot pin 58 to the proximal extremity 54 of operating lever 34. In the exemplified embodiment, extension arm 29 is shown to be of bifurcated construction, comprised of paired struts 32 that embrace said operating lever between the upper and lower surfaces thereof. Second extremity 31 is provided with a filler block 59 having a threaded bore 60 co-extensive with the direction of elongation of said extension arm.

Adjustable securing arm 37 extends between a threaded portion 61 and a hook extremity 62. Said threaded portion engages threaded bore 60 in filler block 59 of said extension arm. In the illustrated embodiment, an adjusting collar 63 is provided for further adjustment of the effective length of securing arm 37. Said adjusting collar is internally threaded, and may be associated with an auxiliary threaded rod 64 that engages bore 60.

The paired gripping members 15 and 16 are installed onto support surface 11 by means of base plates 26 of said hinges. The manner of installation is such as to dispose rails 17 in facing, parallel relationship, permitting said rails to lie flat against said support surface in the storage state shown in FIG. 1. The spacing between the gripping members is selected based upon the size of the wheels or tires that will be acted upon. One set of gripping members may be properly disposed for each of the 2, 3 or 4 wheels of the vehicle intended to be transported. It is generally preferred to have said rails oriented in the direction of travel of vehicles that will be driven onto said support surface.

Latching means in the form of assembly 48 for engaging lever 34 in the active state of the securing apparatus is shown comprised of paired parallel retainer arms 49 welded to the upper and lower surfaces of rail 17, and having aligned apertures 50. A lock pin 51 is adapted to be removably inserted through said apertures.

A hub-engaging post 65 may be welded to the upper surface of one of the rails 17 in orthogonal disposition thereto. Said post 65 serves to further immobilize a wheel which is gripped by the apparatus of this invention.

In the operation of the securing apparatus of the present invention, a wheeled vehicle is driven or otherwise caused to rest upon support surface 11, with at least one but preferably all of the wheels centered between the paired gripping members in their storage state. The gripping members are then swung to their upright active state, as shown in FIGS. 2–5. The hook extremity of securing arm 37 is then caused to engage aperture 46 of opposing rail 17 while the distal extremity of lever 34 is directed generally outwardly away from that rail which supports said lever. Lever 34 is then pulled to cause its distal extremity to return to close proximity with associated rail 17 and enter the space between retainer arms 49. Lock pin 51 is then inserted through said arms to secure said lever. Such action causes the interactive rails to tightly embrace the tire portion of the wheel.

While particular examples of the present invention have been shown and described, it is apparent that changes and modifications may be made therein without departing from the invention in its broadest aspects. The aim of the appended claims, therefore is to cover all such changes and modifications as fall within the true spirit and scope of the invention.

Having thus described my invention, what is claimed is:

1. Securing apparatus for immobilizing at least one wheel of a wheeled vehicle resting upon a support surface of a transporting conveyance, said wheel having resilient sidewall structure, said apparatus comprising:
  a) paired gripping members elongated between first and second extremities and adapted to hingedly engage said support surface in a manner permitting rotative motion between a storage state which disposes said gripping members upon said support surface, and an active state disposing said gripping members in facing parallel spaced apart relationship upright from said support surface, each gripping member including a straight rail elongated between first and second extremities and fabricated of square tubular steel having upper and lower surfaces and opposed inside and exterior surfaces, and
  b) levered locking means associated with the extremities of said gripping members and adapted to draw said gripping members together, producing said active state which applies compressive force upon said sidewall structure of said wheel of said wheeled vehicle disposed upon said support surface in a manner wherein the plane of the circumference of said wheel is disposed in parallel relationship between said gripping members.

2. An assembly comprised of at least two units of the apparatus of claim 1 disposed in a manner to immobilize at least two wheels of said wheeled vehicle.

3. The apparatus of claim 1 wherein at least two hinges are associated with each rail.

4. The apparatus of claim 3 wherein said hinges are comprised of a pivoting arm and an apertured base plate.

5. The apparatus of claim 4 wherein said pivoting arm is attached to said exterior surface of the associated rail.

6. The apparatus of claim 4 wherein said pivoting arm and base plate are interengaged by a removable pivot pin.

7. The apparatus of claim 1 wherein said levered locking means is comprised of an operating lever, an extension arm, and an adjustable securing arm.

8. The apparatus of claim 7 wherein said operating lever is elongated between proximal and distal extremities.

9. The apparatus of claim 8 wherein said operating lever is engaged adjacent the proximal extremity by a first pivot pin.

10. The apparatus of claim 9 wherein said first pivot pin is held by paired plates attached to upper and lower surfaces of the associated rail adjacent an extremity of said rail, thereby enabling said operating lever to swing in a horizontal path.

11. The apparatus of claim 10 wherein the horizontal path of said operating lever includes an extreme position which disposes said lever in close proximity to the rail with which it is associated, corresponding to said active state of the apparatus.

12. The apparatus of claim 11 wherein said operating lever, in said active state, is secured by latching means associated with said rail.

13. The apparatus of claim 12 wherein said latching means is comprised of paired parallel retainer (49) arms attached to upper and lower surfaces of said rail.

* * * * *